United States Patent Office 2,746,869
Patented May 22, 1956

2,746,869

CONDIMENT COMPOSITION

Grace Ellis, San Francisco, Calif.

No Drawing. Application February 25, 1953,
Serial No. 338,893

2 Claims. (Cl. 99—144)

This invention relates to a food composition and to a method for preparing the same and it has particularly reference to a food composition containing a plurality of condiments or spices. The invention has for its main object to produce a concentrated or spiced food paste which can be preserved indefinitely and which may be used as a dish, and contains in a concentrated form all the spices necessary for producing a spiced food but which also may be used for the seasoning of cooked food, said condiment preparation being especially suitable for all kinds of meat, including chicken, fish, seafood, etc. and for eggs, vegetables, soups and the like.

It has been repeatedly proposed to prepare condimentation products in the shape of a dry seasoning material containing extracted essential oil and oleo resins of many spices mixed with a soluble and edible carrier. However these condimentation products were in general not successful on account of the many difficulties which are connected with the preparation of such products.

The flavor producing substances of most spices are almost regularly contained within the cells of the plants or seeds which form the spices and it is therefore necessary to grind or pulverize the plants or seeds to a fine powder in order to destroy the cellular structure to permit the escape of the said substances so that they may become active. However, when thus exposed the flavoring substances which are volatile easily evaporate and therefore special means are necessary to prevent evaporation, oxidation, and other processes. On account of the very delicate flavor, easily destroyed or changed by any chemical or other process it is as a rule not possible to preserve the flavor possessed by the spices or condiments in a dry mixture for this reason.

Another difficulty connected with the production of a condiment preparation consists in the fact that the flavor in order to be active in the cooked food must be released gradually. If released immediately most of it disappears before and during cooking.

When aggregate flavors are to be preserved, a special difficulty arises, as usually the product is subject in its entirety to some operational steps with a view of preserving it. In this case however the individual constituents act differently so that the process involves a material change in the capability of the mixture to produce the desired aggregate flavor.

According to the invention a food product containing a mixture of many spices or condiments is produced which is brought into the shape of a concentrated spiced food paste by means of a method which avoids to a large degree the above named disadvantages. These spices are finely ground and in order to obtain a paste which is stable and has a stabilized flavor gradually given off, a coconut juice is added to the mixture which is then treated in boiling peanut oil the temperature being maintained close to the point at which evaporation occurs.

The coconut juice which is added to form the paste also serves the additional purpose of forming an accentuating substance. Such accentuating substances are used not because they have a distinct flavor of their own but because when blended with other flavors they enhance and accentuate the latter.

The object of the invention is therefore to provide a food product in the shape of a paste which may be used either as such or as a condiment. The latter use is of special interest, and the paste is preferably so prepared that it contains a mixture of a large number of spices and condiments in concentration, the flavor of which is stabilized and does not change when the paste is added to other food products before or during the preparation of said products.

A further object of the invention consists in providing a method of preparing and preserving the food or condiment preparation which permits to obtain a durable and stabilized paste of fixed flavor which flavor is given off gradually.

In addition to these main objects further ancillary objects will be apparent from the following detailed specification.

In order to prepare a condiment paste according to the invention preferably the following ingredients are used:

Coriander, fenugreek, garlic, dill seeds, allspice, salt, saffron, turmeric, mace, bay leaf, cinnamon, onions, chili powder, cayenne pepper, ginger, cumin, white pepper corns, mustard seeds. The ingredients which are obtainable in fresh condition like onions, garlic, etc. may be used in this condition, but preferably they are used in a dehydrated state.

These ingredients are pulverized so as to extract the essential oils and other flavoring principles from them and the material thus obtained is thoroughly mixed and is then mixed with coconut juice. This coconut juice is obtained by grating and squeezing the white of the coconut.

The paste which is thus obtained is then cooked in boiling peanut oil, stirring constantly for at least one hour, with a temperature maintained just below and as closely as possible to the evaporation point. After this treatment the mixture so treated is bottled and canned and is hermetically sealed in.

*Example*

| Ingredient | Amount | |
|---|---|---|
| Coriander | lb | 1 |
| Cardamon | oz | 3 |
| Fenugreek | oz | 8 |
| Garlic, dehydrated | oz | 4 |
| Dill seeds | oz | 3 |
| Allspice | oz | 3 |
| Saltspice | oz | 3 |
| Salt | oz | 6 |
| Saffron | oz | 8 |
| Turmeric | oz | 8 |
| Mace | oz | 3 |
| Bay leaf | oz | 2 |
| Onions, fresh or dehydrated | lb | 2 |
| Chili powder | oz | 3 |
| Cayenne pepper | oz | 8 |
| Ginger, fresh or dehydrated | oz | 4 |
| Cumin | oz | 8 |
| White pepper corns | oz | 3 |
| Mustard seeds | oz | 3 |
| Coconut extract or juice | qt | 2 |
| Peanut oil | gal | 1 |

When dehydrated vegetables are used the quantities must be correspondingly adjusted.

These condiments are treated as above stated.

As will be seen from the above description some of the materials of the mixture are of such a nature that they may serve as a carrier for the flavoring principle of others, a fact which greatly contributes to the stabilization as it prevents the flavor of some of the flavoring substances of the mixture from disappearing when the mixture is made.

The addition of the coconut juice not only provides a stable paste but it provides also a suitable background and an accentuation substance for some of the spices and enhances the flavor of some of its ingredients which thus comes to the foreground.

The paste is completely stable when stored in sealed containers and keeps indefinitely without flavor deterioration.

When used as a condimentation product, the paste thus prepared may be applied to season various meats such as beef, veal, pork and lamb, and it is also applicable for chicken, fish and seafoods.

The preparation may also be used as a spiced curry, and form a food product by itself. It is also usable in connection with dishes prepared from eggs, vegetables, soups and so forth.

It will thus be seen that the invention provides a paste to be used as a dish or it may take the place of a number of flavoring sauces and other fluids which do not contain such an assortment of flavors and the paste can be used either as such or in connection with a fluid for seasoning in any quantity which is thought to be necessary.

It will be clear that while it is essential to have a mixture of the above named condiments a further addition or the omission of one or the other of the condiments will not in any way change the nature of the above invention as defined in the annexed claims.

What is claimed as new is as follows:

1. A condiment and food preparation comprising pulverized coriander, fenugreek, salt, garlic, dill seeds, allspice, saffron, turmeric, mace, bay leaves, cinammon, onions, cayenne pepper, ginger, cumin, white pepper corns and mustard seed, and coconut juice and peanut oil.

2. A condiment and food preparation containing for every gallon of peanut oil and every 2 quarts of coconut juice, 1 lb. of coriander, 8 oz. of fenugreek, 3 oz. of cardamon, 4 oz. of garlic, 3 oz. of dill seeds, 3 oz. of allspice, 3 oz. of saltspice, 6 oz. of salt, 8 oz. of saffron, 8 oz. of turmeric, 3 oz. of mace, 2 oz. of bay leaves, 2 oz. of cinnamon, 2 lb. of onions, 3 oz. of chili powder, 8 oz. of cayenne pepper, 4 oz. of ginger, 8 oz. of cumin, 3 oz. of white pepper corns and 3 oz. of mustard seed.

References Cited in the file of this patent

UNITED STATES PATENTS

| Number | Name | Date |
| --- | --- | --- |
| 1,631,858 | Gelfand | June 7, 1927 |
| 1,653,882 | Southway | Dec. 27, 1927 |
| 1,701,084 | Richardson et al. | Feb. 5, 1929 |
| 1,829,431 | Allen | Oct. 27, 1931 |
| 1,971,910 | Griffith | Aug. 28, 1934 |
| 2,168,360 | Musher | Aug. 8, 1939 |
| 2,411,201 | Forkner | Nov. 19, 1946 |